Feb. 11, 1936. J. W. DAWSON 2,030,100
ELECTRIC DISCHARGE APPARATUS
Filed May 11, 1934

WITNESSES:
Leon J. Vaga.
Hymen Diamond

INVENTOR
John W. Dawson
BY
F. N. Legle.
ATTORNEY

Patented Feb. 11, 1936

2,030,100

UNITED STATES PATENT OFFICE 2,030,100

ELECTRIC DISCHARGE APPARATUS

John W. Dawson, Wilkinsburg, Pa., assignor to Westinghouse Electric & Manufacturing Company, East Pittsburgh, Pa., a corporation of Pennsylvania Application May 11, 1934, Serial No. 725,107

11 Claims. (Cl. 175—363)

My invention relates to electric discharge apparatus and has particular relation to apparatus for controlling the supply of power of a load which is to be continuously varied from one value to another.

The invention has particular applicability in the theater switchboard art. In theaters, it is customarily desirable to vary both the stage and auditorium illumination as the scenes on the stage or screen change. The variation must necessarily be continuous from one value to another and it is essential that no time be lost in producing the change.

Accordingly, the practice has been in accordance with the teaching of the prior art to provide a plurality of pre-set voltage-dividers. These voltage-dividers are adjusted to the desired values before the performance. They are connected to each other through what may be designated as a differential voltage-divider the windings of which have considerably higher resistance than the windings of the pre-set voltage-dividers. The latter voltage-divider is in turn coupled to an amplifier system of one type or another and the operation of the amplifier system is controlled in such manner by the differential voltage-divider that when the latter is varied, the output illumination controlled may be varied from a position corresponding to one pre-set voltage-divider adjustment to a position corresponding to the subsequent pre-set voltage-divider adjustment.

In accordance with the teachings of the prior art, the practice is to control the illumination by controlling the current output of an electric discharge device such as a Grid-Glow tube or an Ignitron tube. The variations in potential supplied by the voltage-divider system are impressed between the control electrode and one of the principal electrodes of the electric discharge device, and, as the potential is varied, the output of the electric discharge device is varied and, therefore, the illumination is varied.

In the following discussion, I shall regard one of the principal electrodes of the electric discharge device utilized in the system as the reference point of potential. Where an electric discharge device of the type having a cathode is utilized (as is the preferred practice) the cathode will be taken as the reference. The potential impressed between the anode and the cathode, or between the principal electrodes, where a cathode is not incorporated or where two cathodes are incorporated instead of an anode and a cathode, I shall designate as the principal potential. The potential impressed between the control electrode and the reference point will be designated as the control potential.

The voltage-divider system discussed hereinabove lends itself particularly to the controlling of the output of an electric discharge device by variation of the magnitude of the control potential relative to the principal potential. For a number of reasons, which need not be discussed here, it is desirable that the output of the electric discharge device be controlled by shifting the phase of the control potential relative to the principal potential rather than by varying the magnitude.

It is accordingly an object of my invention to provide a system of the type incorporating an electric discharge device having a control electrode and a plurality of principal electrodes for controlling the supply of current to a load wherein a voltage-divider shall be utilized to provide the necessary variations and the voltage-divider shall be so coupled to the other elements appurtenant to the discharge device that the output of the discharge device shall be varied by shifting the phase of the control potential applied thereto relative to the principal potential.

A further object of my invention is to provide simple and tractable apparatus for shifting the phase of the control potential relative to the principal potential of an electric discharge device to control the supply of current therethrough to a load.

An additional object of my invention is to provide apparatus incorporating an electric discharge device having a cathode of the type which is to be heated to a predetermined temperature before it can supply current without deteriorating; wherein the cathode shall be protected against premature supply current.

An incidental object of my invention is to provide a phase shifting system whereby it shall be possible to shift the phase of a potential supply through a complete angle of 180°.

More concisely stated, it is an object of my invention to provide simple and inexpensive apparatus for continuously controlling the supply of power to a variable load by utilizing an electric discharge device and by shifting the control potential of the device relative to the principal potential thereof.

According to my invention, I provide a system in which the control potential consists of a component out of phase with the principal potential and a component composed of two superposed component elements one in opposite phase to the principal potential and the other in phase with the principal potential. The latter element is provided by a variable voltage-divider system of the type utilized in the theater switchboard art. As the supply of this element is varied, the phase relationship of the net control potential relative to the principal potential may be varied in any desired manner.

If the electric discharge device utilized is of the hot cathode type, the cathode may be protected from deterioration by the premature application of such potential as will cause current to be transmitted through the discharge device by delaying the application of the variable in-phase component element which is superposed on the opposite-phase element. As long as the opposite-phase element alone is applied, the control potential supplied to the discharge device is so related to the principal potential that the discharge device passes only a small current and in consequence thereof, the cathode is not deteriorated.

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawing, in which Figure 1 is a diagrammatic view showing the preferred embodiment of my invention;

Figure 1:
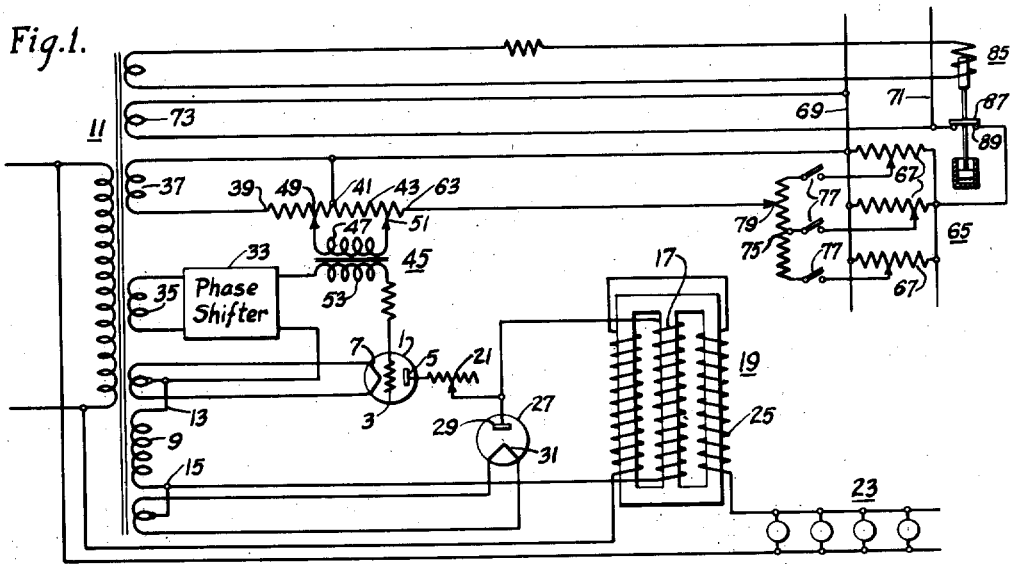

The apparatus shown in Fig. 1 comprises an electric discharge device 1 having a control electrode 3, an anode 5 and a cathode 7. In the preferred practice of my invention, the electric discharge device is of the gas filled type and the cathode is of the filamentary type and preferably consists of a metal such as nickel or an alloy of nickel coated with an oxide of an alkaline earth metal. If current is transmitted by the discharge device before the cathode attains a predetermined temperature, the cathode is deteriorated by positive ion bombardment and consequently it is essential to eliminate premature transmission of current through the device.

It is apparent that electric discharge devices of other types may be utilized in the practice of my invention. For example, a mercury pool device of the Ignitron type or a high vacuum device are possibilities. At times it may also be desirable to utilize a symmetrically conductive discharge device rather than the asymmetrically conductive device 1 which is utilized in the apparatus shown in Fig. 1.

The discharge device 1 is supplied with power from a secondary section 9 of a transformer 11, one terminal 13 of which is connected to the cathode 7 and the other terminal 15 of which is connected to the anode 5 through the saturating winding 17 of a saturable-core reactor 19 and through a variable resistor 21. The load 23 is supplied with power through the output windings 25 of the reactor 19 in the usual manner. As the current through the discharge device 1 is carried, the saturation of the reactor 19 is varied and consequently, the impedance in series with the load 23 is varied. The current supplied to the load 23 may thus be controlled by controlling the output of the discharge device 1.

To make certain that the current through the saturating winding 17 of the reactor 19 is continuous, a rectifier 27 is connected across the winding, the anode 29 of the rectifier being connected to the anode 5 of the discharge device 1 through the variable resistor 21 and the cathode 31 of the rectifier being connected to the lower terminal 15 of the secondary section 9. The rectifier 27 functions to maintain the current in the saturating winding during the intervals during which it is not supplied through the discharge device. It is apparent that the rectifier 27 may be of any suitable type. It may be of the hot cathode gas filled or high vacuum type, or of the mercury pool type or again of the cold cathode type.

Since my invention is particularly applicable to theater lighting, the load 23 is shown as a system of illuminating units. Loads of other types may of course be applied.

The control potential supplied to the discharge device 1 is composed of several components. One component is supplied through a phase-shifting system 33 from another secondary section 35 of the power supply transformer 11 and is at a phase angle substantially different from 180° relative to the principal potential. Another component is in opposite phase to the principal potential and is supplied by still another secondary section 37. One terminal tap 39 and an intermediate tap 41 of a voltage-divider 43 are connected to the terminals of the secondary section 37.

The potential output of the voltage-divider 43 is supplied between the control electrode 3 and the cathode 7 through a transformer 45, one terminal of the primary 47 of which is connected to a movable contact 49 of the voltage-divider 43 while the other terminal is connected to another movable contact 51 of the voltage-divider. The secondary 53 of the transformer 47 is connected in series with the output circuit of the phase-shifter 33.

Figure 3:
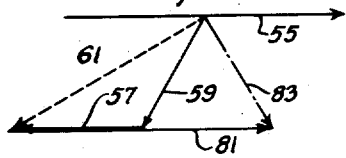
Fig. 3 is a vector diagram illustrating the functioning of the apparatus shown in Fig. 1.

The functioning of the system is illustrated vectorially in Fig. 3. In this view, the upper horizontal vector 55 represents the principal potential. The lower vector 57 parallel to the upper vector and opposite in direction thereto represents the control potential component supplied by the last mentioned secondary section 37 of the power-supply transformer 11. The full line oblique vector 59 represents the control potential component supplied through the phase shifter 33. It is apparent that in the absence of additional potential supplied to the voltage-divider 43, the net control potential will be represented by the broken line vector 61 which it will be noted is almost in opposite phase to the principal potential vector 55. As long as the broken line vector 61 represents the control potential supplied to the discharge device 1, the current output of the the device is comparatively small and the cathode 7 is protected from deterioration.

An in-phase component of control potential is super-imposed on the opposite phase component between the remaining terminal tap 63 and the intermediate tap 41 of the voltage-divider 43 and through a pre-set voltage-divider system 65. In the pre-set voltage-divider system, a plurality of pre-set voltage-dividers 67 are connected between bus lines 69 and 71 supplied with potential from a secondary section 73 of the power-supply transformer 11. Each of the pre-set voltage-dividers 67 is capable of being connected to the others through a differential voltage-divider 75 of considerably greater resistance than the pre-set voltage-dividers and through a switch 77. The movable contact 79 of the differential voltage-divider 75 is connected to the terminal tap 63 of the voltage-divider 43 and one bus-line 69 is connected to its intermediate tap 41.

In the practice of my invention, the pre-set voltage-dividers 67 are adjusted to correspond to the desired values of illumination before the performance. During the performance, the switches 77 between one voltage-divider 67 and the one necessary for the subsequent scene are closed and when the transition is to occur, the movable contact 79 of the differential voltage-divider 75 is shifted from a position corresponding to the first pre-setting to the position corresponding to the subsequent pre-setting.

The connection between the pre-set voltage-divider system 65 and the voltage-divider 43 is such that when the pre-set voltage-divider system is supplied with power, the potential impressed through it between the control electrode 3 and the cathode 7 is in phase with the principal potential and, therefore, in opposite phase to the opposite-phase potential component from the secondary section 37.

The potential supplied by the pre-set system 65 is represented in Fig. 3 by a vector 81 parallel to the principal potential vector 55 and in phase therewith. The net potential supplied to the electric discharge device when power is supplied to the pre-set system 65 is represented by a dot-dash vector 83 which, it will be noted, lags the principal potential by a comparatively small angle. In consequence thereof, the output of the discharge device 1 is of considerable magnitude under such circumstances.

It is seen that as the adjustments of the pre-potentiometer 67 are varied and as the movable contact 79 of the differential voltage-divider 75 is shifted, the parallel vectors 57 and 81 in Fig. 3 may be varied from one magnitude in the opposite phase position to another magnitude in the in-phase position and as this variation takes place, the phase of the control potential relative to the principal potential is varied. It is apparent also that by adjusting one or the other of the movable taps 49 and 51 associated with the voltage-divider 43, the relationship between the vectors 57 and 81 may be adjusted and varied in any desired manner, and consequently the range covered by the system may be varied. The voltage-divider 43 is utilized to provide the adjustments for maximum and minimum output of the system, the contact 51 being set to provide the desired maximum adjustment and the contact 49 being set to provide the desired minimum adjustment. The output of the system may be varied from the desired minimum to the desired maximum by varying the voltage-dividers 65 and 75 of the pre-set system 65. In certain modifications of my invention it is possible to replace the voltage-divider 43 entirely by the variable resistor 21.

To protect the cathode 7 of the discharge device 1 from deterioration, I provide a time delay relay 85 the movable contactor 87 of which is operated a predetermined interval of time after the main switch (not shown) is closed. The interval of time is sufficient to enable the cathode of the electric discharge device to attain the proper temperature of emission.

When the system is not in use the movable contactor 87 of the relay 85 is disengaged from its corresponding fixed contacts 89 and the bus line 71 in which the contacts 89 are inserted is maintained open. The pre-set voltage-divider system 65 is therefore deenergized. When the main switch is closed the apparatus is supplied with power but the relay 85 does not operate until the predetermined interval of time has elapsed. During the interval, the control potential supplied to the discharge device is in the condition represented by the broken line vector 61 substantially in opposite phase to the principal potential and the cathode is protected from deterioration. When the relay is eventually operated, the proper potential is supplied to the discharge device to energize it in the manner explained above.

Figure 2:
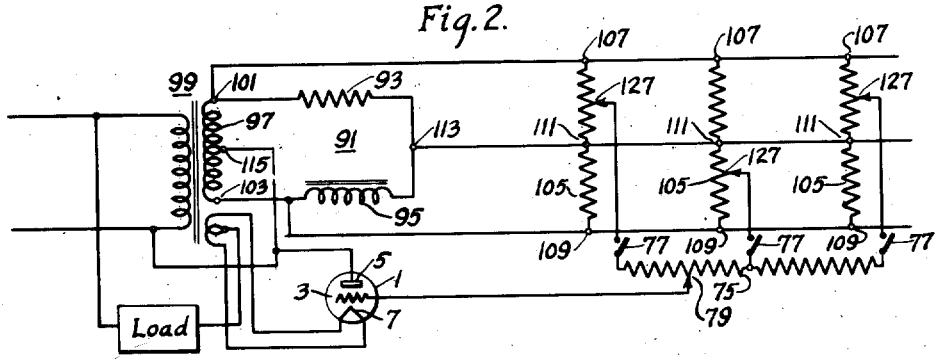
Fig. 2 is a diagrammatic view of a salient feature of a modification of my invention.

In Fig. 2, a phase shifting system is shown. The phase shifting system may be utilized as the phase shifter 33 in the apparatus shown in Fig. 1, or it may and preferably is utilized in place of the complete system whereby control potential is provided. In Fig. 2, the system is shown coupled to a discharge device 1 as it would in apparatus in which it completely replaces the control potential supply system shown in Fig. 1.

The apparatus shown in Fig. 2 comprises a network 91 consisting of a resistor 93 and a reactor 95 connected in series with each other. The reactor 95 is preferably, as shown, an inductor. However, it may be a capacitor. The principal feature which is desired of the impedances of the network is that they be of a type such that when an alternating potential is applied across the network, the current transmitted through one of the impedances is in quadrature with the current transmitted through the other.

An alternating potential is supplied to the network 91 from the secondary 97 of a transformer 99 the terminal taps 101 and 103 of which are connected to the terminals of the network. A plurality of pre-set voltage-dividers 105 are connected in parallel with the network 91 across the secondary, the terminal taps 107 and 109 of the voltage-dividers being connected to the terminal taps 101 and 103 of the secondary. The voltage-dividers 105 are provided with an intermediate tap 111 and the intermediate tap is connected to the junction point 113 of the reactor 95, and the resistor 93. In certain modifications of my invention the intermediate tap 111 is connected to some point intermediate the terminals of the network 91 rather than to the junction point 113. As in the apparatus shown in Fig. 1 the differential voltage-divider 75 is coupled to the pre-set voltage-dividers 105 through switches 77 in the usual manner.

The secondary 97 is provided with an intermediate tap 115 and it is connected to the anode 5 of the discharge device 1 to be controlled. The control electrode 3 of the discharge device is connected to the movable contact 79 of the differential potentiometer 75.

Figure 4:
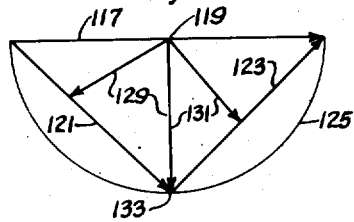
Fig. 4 is a vector diagram illustrating the functioning of the apparatus shown in Fig. 2.

The functioning of the system is illustrated in Fig. 4 vectorially. The horizontal vector 117 represents the potential supplied by the secondary 97, the intermediate tap 115 or its electrical equivalent the anode 5 being represented by a point 119 intermediate the ends of the vector. The potential impressed across the resistor 93 and the potential impressed across the inductor 95 are in quadrature with each other and are represented by vectors 121 and 123 which lie on a semi-circle 125, of which the horizontal vector 117 is the diameter. The resistor vector 121 lags in phase behind the reactor vector 123.

Consider any one of the pre-set voltage-dividers 105 as its movable contact element 127 is displaced from its upper terminal 107 to its intermediate tap 111. Under such circumstances, the potentials of the movable contact 127 correspond to the potentials of points along the resistor 93.

As the movable contact 127 is displaced from the upper terminal 107 of the voltage-divider 105 to the intermediate tap 111, the potential impressed between the movable contact 127 and the intermediate terminal 115 of the secondary 97 or between the anode 5 and the control electrode 3 of the discharge device 1 may be represented by a vector 129 one terminal of which is at the point corresponding to the intermediate tap 115 of the secondary 97 and the other terminal of which lies on the resistor vector 121. The vector 129 varies from a position in which it corresponds to the electrical potential between the intermediate tap 115 to the upper terminal 101 of the secondary 97 to a position in which it corresponds to the electrical potential between the intermediate tap 115 and the junction point 113 of the impedances 93 and 95.

Again, as the movable contact 127 of the voltage-divider 105 moves from the intermediate tap 111 to the lower terminal 109 the potential impressed between the movable contact 127 and the intermediate tap 115 of the secondary 97 corresponds to points along the inductor 95 and may be represented by a vector 131 which extends from the point 119 representing the intermediate tap 115 of the secondary 97 to points along the vector 123 representing the inductor potential. The vector 131 rotates from the intersection point 133 of the resistor and inductor vectors 121 and 123 to coincide with the vector 117 representing the secondary potential. It is seen that as the movable contact 127 of the pre-set voltage-dividers 105 are varied, the potential impressed between the intermediate tap 115 of the secondary 97, and the movable taps 127 that is, substantially between the anode 5 and the control electrode 3 of the discharge device 1 may be varied through a full angle of 180°. In practice, the movable contact elements 127 of the pre-set voltage-dividers 105 are adjusted before the performance and the adjustment during the performance is made by the movable contact of the differential voltage-divider 75.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. Translating apparatus comprising an electric discharge device having a control electrode and a plurality of principal electrodes, means for applying a periodic principal potential on said electric discharge device, means for applying a periodic control potential on said electric discharge device that is composed of a component which may be represented by a vector parallel to the vector representing the principal potential and a component which may be represented by a vector at an angle less than 180° to the vector representing the principal potential and means for varying the first said component continuously from a predetermined magnitude in opposite phase to the principal potential to a predetermined magnitude in phase with the principal potential.

2. Translating apparatus comprising an electric discharge device having a control electrode and a plurality of principal electrodes, said device being of the type having an energized condition and a deenergized condition and being capable only of abrupt transitions from one condition to the other, means for applying a periodic principal potential on said discharge device, means for applying a periodic control potential on said discharge device that is composed of a component which may be represented by a vector parallel to the vector representing the principal potential and a component which may be represented by a vector at an angle less than 180° to the vector representing the principal potential and means for varying the first said component continuously from a predetermined magnitude in opposite phase to the principal potential to a predetermined magnitude in phase with the principal potential.

3. Translating apparatus comprising an electric discharge device having a control electrode and a plurality of principal electrodes, means for applying a principal potential on said electric discharge device, means for applying a control potential on said electric discharge device that is composed of a component which may be represented by a vector parallel to the vector representing the principal potential and a component that may be represented by a vector at an angle less than 180° to the vector representing the principal potential and means for varying the first said components continuously from a predetermined magnitude in opposite phase to the principal potential to a predetermined magnitude in phase with the principal potential, the last said means including a plurality of pre-set voltage-dividers and means for continuously varying the voltage-divider output from that corresponding to one of said settings to that corresponding to another of said settings.

4. Translating apparatus comprising an electric discharge device having a control electrode and a plurality of principal electrodes, means for applying a principal potential to said electric discharge device, means for applying a component of control potential to said electric discharge that may be represented by a vector at an angle less than 180° to the vector representing said principal potential, means for applying a component of control potential to said discharge device that may be represented by a vector parallel to the vector representing the principal potential, a plurality of pre-set voltage-dividers and means for continuously varying the last said component of control potential from a value corresponding to one of said voltage-divider settings to a value corresponding to another of said voltage-divider settings.

5. Translating apparatus comprising an electric discharge device having a control electrode and a plurality of principal electrodes, means for impressing a principal potential on said electric discharge device, means for impressing a component of control potential on said discharge device that differs in phase from said principal potential by an angle different from 180°, means for impressing a component of control potential on said discharge device that is in opposite phase to said principal potential, means for superposing on the last said component a component that is in phase with said principal potential and means for delaying the application of the last said component a predetermined interval of time after the opposite-phase component has been applied.

6. Translating apparatus comprising an electric discharge device having a control electrode, an anode and a hot cathode, said cathode being of the type that deteriorates if principal potential is applied in such manner as to render said discharge device conductive before the cathode is heated to a predetermined temperature, means for impressing a principal potential on said electric discharge device, means for impressing a potential to heat said cathode, means for impressing a component of control potential on said discharge device that differs in phase from said principal potential by an angle different from 180°, means for impressing a component of control potential on said discharge device that is in opposite phase to said principal potential, means for superposing on the last said component a component that is in phase with said principal potential, and means for delaying the application of the last said component a predetermined interval of time after the opposite phase component, the principal potential and the heating potential have been applied.

7. Translating apparatus comprising an electric discharge device having a control electrode and a plurality of principal electrodes, means for impressing a periodic principal potential on said electric discharge device, means for impressing a component of control potential on said discharge device that is periodic and differs in phase from said principal potential by an angle different from 180°, means for impressing a component of control potential on said discharge device that is periodic and in opposite phase to said principal potential, means for superposing on the last said component a component that is in phase with said principal potential and means for varying the magnitude of the last said components from one predetermined value to another.

8. A phase-shifting system comprising a source for applying an alternating potential, a resistance and a reactance connected in series with each other across said source, a voltage-divider having an intermediate tap, means for connecting said voltage-divider across said source in parallel with said resistance and reactance, means for connecting said intermediate tap to the junction point of said reactor and said resistor, a plurality of terminals upon which a desired difference of potential is to be impressed, means for connecting one of said terminals to an intermediate point on said voltage divider and means for connecting another of said terminals to a point on said source.

9. A phase-shifting system comprising a network consisting of two impedances connected in series, said impedances being of a type such that when an alternating potential is impressed across said network, the potential impressed across one of said impedances is in quadrature with the potential impressed across the other, means for impressing an alternating potential across said network, a voltage-divider having an intermediate tap, means for connecting said voltage-divider in parallel with said network, means for connecting said intermediate tap to said network at a point intermediate the terminals thereof, a plurality of terminals upon which a desired difference of potential is to be impressed, means for connecting one of said terminals to an intermediate point on said voltage-divider and means for connecting another of said terminals to a point on said means whereby alternating potential is impressed across said network.

10. In combination, an electric discharge device having a control electrode and a plurality of principal electrodes, means for impressing a principal potential on said electric discharge device, a network consisting of a resistor and a reactor connected in series with each other, means for impressing an alternating potential across the terminals of said network, a voltage-divider having an intermediate tap and a movable contact, means for connecting said voltage-divider in parallel with said network, means for connecting the intermediate tap of said voltage-divider to an intermediate point on said network, means for connecting the anode of said electric discharge device to a point on said means whereby potential is supplied to said network and means for connecting the movable contactor of said voltage-divider to said control electrode.

11. Translating apparatus comprising an electric discharge device having a control electrode and a plurality of principal electrodes, means for impressing a periodic principal potential on said discharge device, means for impressing a periodic control potential on said discharge device, said control potential consisting of a component out of phase with said principal potential by an angle different from 180°, a component in opposite phase to said principal potential, said opposite-phase component being adjusted to a magnitude such that when it alone is applied the output of said discharge device is at the desired minimum, a component in phase with the principal potential, said in-phase component being adjusted to a maximum magnitude such that when said maximum magnitude is superposed on the opposite-phase component, the output of said discharge device is the desired maximum and means for varying said in-phase component from zero to its maximum magnitude.

JOHN W. DAWSON.